UNITED STATES PATENT OFFICE.

WILHELM SCHUMACHER, OF OSNABRÜCK, GERMANY.

MANUFACTURE OF AGGLOMERATED BODIES FROM BLAST-FURNACE DUST.

933,269.  Specification of Letters Patent.  Patented Sept. 7, 1909.

No Drawing.  Application filed June 10, 1908. Serial No. 437,647.

*To all whom it may concern:*

Be it known that I, WILHELM SCHUMACHER, a subject of the Emperor of Germany, and resident of Osnabrück, in the Kingdom of Prussia and Empire of Germany, have invented certain new and useful Improvements in the Manufacture of Agglomerated Bodies from Blast-Furnace Dust, of which the following is a specification.

My invention relates to the manufacture of agglomerated bodies and particularly briquets from blast furnace dust.

It has been found hitherto that briquets could be made from blast furnace dust only with the addition of a greater amount of binding material than required by other substances, for instance by ores of the same fineness. The very powdery nature of the blast furnace dust proved to be a feature adding to the difficulty of the problem. It is true that as a rule fineness of the stuff is believed to increase the facility of producing agglomeration, and certainly blast furnace dust is a material of great fineness, being even finer than most grades of Portland cement; very often as much as 90% of the blast furnace dust will pass through a sieve of 900 meshes per square inch and 50% of it through a sieve of 5000 meshes to the square inch. Notwithstanding this great fineness, ordinary blast furnace dust offers difficulties to its agglomeration. The reason of this behavior I find in the approximately spherical form, which the grains of blast furnace dust exhibit when viewed under a microscope, this form being due to the rubbing and perhaps to the sintering of all fine points and edges as a result of the strong pressure of the air blast in the blast furnace. Particles of this approximately spherical form, although very fine, will not properly unite into a coherent body, even under high pressure such as used in briqueting. For instance, a briquet made from blast furnace dust under a pressure of 200 kg. per square cm. with a 15% addition of binding material, is still capable of absorbing as much as 20% of water, thus proving the existence of a considerable aggregate of voids in the briquet.

In order to overcome the difficulty above mentioned and to enable the blast furnace dust to be more readily formed into coherent bodies, I destroy the approximately spherical shape of the particles by grinding the blast furnace dust, which may be done in a tube mill or a pulverizing mill such as are used in the cement industry. This operation produces irregular splintery and more or less sharp-edged bodies or needles from the approximately spherical grains of blast furnace dust. The material is then in a condition of much higher compressibility, so that when formed into briquets its density and solidity become much greater than when the blast furnace dust is used in its original condition in which it is composed of approximately spherical bodies.

The grinding also presents another advantage, particularly when applied to fresh blast furnace dust which has not become hydrated. I have found that the grinding liberates, as it were, some binding substances contained in the blast furnace dust, which binding substances enable the material to be briqueted or agglomerated in some cases without the use of any additional binding material, the mass hardening under certain conditions very much like cement. This binding action of finely ground blast furnace dust is so great that it may be utilized not only for agglomerating the blast furnace dust itself, but for agglomerating other substances such as fine ores, the blast furnace dust in this case forming the binder. I may therefore produce agglomerated bodies from blast furnace dust ground as explained above, by simply moistening the material with water, forming it into lumps or blocks by pressure or otherwise and then exposing it to the action of the air to cause it to harden. This process may be carried out with the blast furnace dust alone, or with the addition of other fine materials, such as fine ores or blast furnace slag. The hardening of the mass may be obtained by exposure to air as stated above, or by heating in the open air, or by treating the lumps or blocks with steam under pressure in a closed receptacle.

I may also, in some cases, add binding materials if the binding action of the blast furnace dust should not be strong enough. Any of the usual binding materials may be employed. I have found that certain salts and acids are particularly available for use as binding materials in my process. Chlorids, (except those of the alkalies) sulfates, sulfids, particularly those of the alkaline earth metals and those of metals of the iron group are best adapted for this purpose. The particular salt, or mixture of salts best suited for each individual blast furnace dust has to be ascertained by experiment. The amount of binder added to the blast furnace dust will vary from a fraction of 1% to 4 or 5%. For economical reasons I may use mixtures of salts obtained as waste products, for instance in the potash industry, or in the extraction of copper or the manufacture of soda. Instead of the salts I may employ the corresponding acids such as sulfuric acid, sulfurous acid and hydrochloric acid, etc. These acids then form soluble salts with certain ingredients of blast furnace dust, such as the iron contained therein. The action of these salts is chiefly a catalytic one, that is, they do not themselves form chemical compounds possessing any material binding power. Of course, salts of this character may be used in connection with other suitable binding materials, but care should be taken not to employ a binding material having strongly alkaline properties, as this would interfere with the proper action of said salts. For this reason ordinary Portland cement should not be used as a binding material in conjunction with the catalytic salts above mentioned, since it would evolve hydrated lime, which will have a restraining action on the catalytic action of the salts. If, therefore, any binding materials are added which contain lime, they should be so selected that their binding action by the evolution of hydrate of lime will not take place until after the blast furnace dust has been hardened entirely, or at least for the greater part.

I claim as my invention:

1. The herein described process of agglomerating blast furnace dust, which consists in grinding such dust so as to transform its approximately spherical grains into fragments of irregular shape and then forming the mass into coherent bodies.

2. The herein described process of agglomerating blast furnace dust, which consists in grinding such dust so as to transform its approximately spherical grains into fragments of irregular shape, moistening the mass and forming it into coherent bodies.

3. The herein described process of agglomerating blast furnace dust, which consists in grinding such dust so as to transform its approximately spherical grains into fragments of irregular shape, adding to the mass substances having a catalytic influence upon the hardening process and forming the mixture into coherent bodies.

4. The herein described process of agglomerating blast furnace dust, which consists in grinding such dust so as to transform its approximately spherical grains into fragments of irregular shape and adding a suitable binding material and forming the mixture into coherent bodies.

5. The herein described process of agglomerating blast furnace dust, which consists in grinding such dust so as to transform its approximately spherical grains into fragments of irregular shape, adding to the mass other binding material together with substances having a catalytic action on the hardening process, and forming the mixture into coherent bodies.

In witness whereof I have hereunto signed my name in the presence of two subscribing witnesses.

WILHELM SCHUMACHER.

Witnesses:
  HENRY HASPER,
  WOLDEMAR HAUPT.